United States Patent [19]

Kurakake et al.

[11] Patent Number: 4,811,098
[45] Date of Patent: Mar. 7, 1989

[54] PICTURE INTRODUCING APPARATUS

[75] Inventors: Mitsuo Kurakake; Shoichi Otsuka, both of Hino; Yutaka Muraoka, Hachioji, all of Japan

[73] Assignee: Fanuc Ltd., Minamitsuru, Japan

[21] Appl. No.: 167,853

[22] PCT Filed: Jul. 31, 1987

[86] PCT No.: PCT/JP87/00575
§ 371 Date: Jan. 27, 1988
§ 102(e) Date: Jan. 27, 1988

[87] PCT Pub. No.: WO88/01461
PCT Pub. Date: Feb. 25, 1988

[30] Foreign Application Priority Data

Aug. 20, 1986 [JP] Japan .................... 194566

[51] Int. Cl.$^4$ .............................. H04N 5/14
[52] U.S. Cl. .................... 358/160; 358/21 R
[58] Field of Search .......... 358/160, 21 R, 280, 358/148

[56] References Cited

U.S. PATENT DOCUMENTS 4,723,163 2/1988 Skinner .................... 358/160
4,751,573 6/1988 Kubota .................... 358/160

FOREIGN PATENT DOCUMENTS 179064 10/1983 Japan .

Primary Examiner—James J. Groody
Assistant Examiner—Michael D. Parker
Attorney, Agent, or Firm—Staas & Halsey

[57] ABSTRACT

In a picture processing apparatus, a front porch time (FP) conforming to a picture signal from a particular picture input unit (2) is stored beforehand in a register (R) by a host computer (8). When the picture input unit (2) outputs a horizontal synchronizing signal (HSYNC), the front porch time (FP) from issuance of the horizontal synchronizing signal (HSYNC) until the beginning of a significant picture information interval (PCPD) is calculated by referring to the register (R) and counting down the value from the register. The picture information is then introduced into a picture memory (6) from the calculated beginning of the significant picture information interval (PCPD). The picture processing apparatus may be used for a variety of different picture input units, as the host computer stores the front porch time corresponding to the particular picture input unit to be used in the register (R) prior to picture processing.

9 Claims, 3 Drawing Sheets

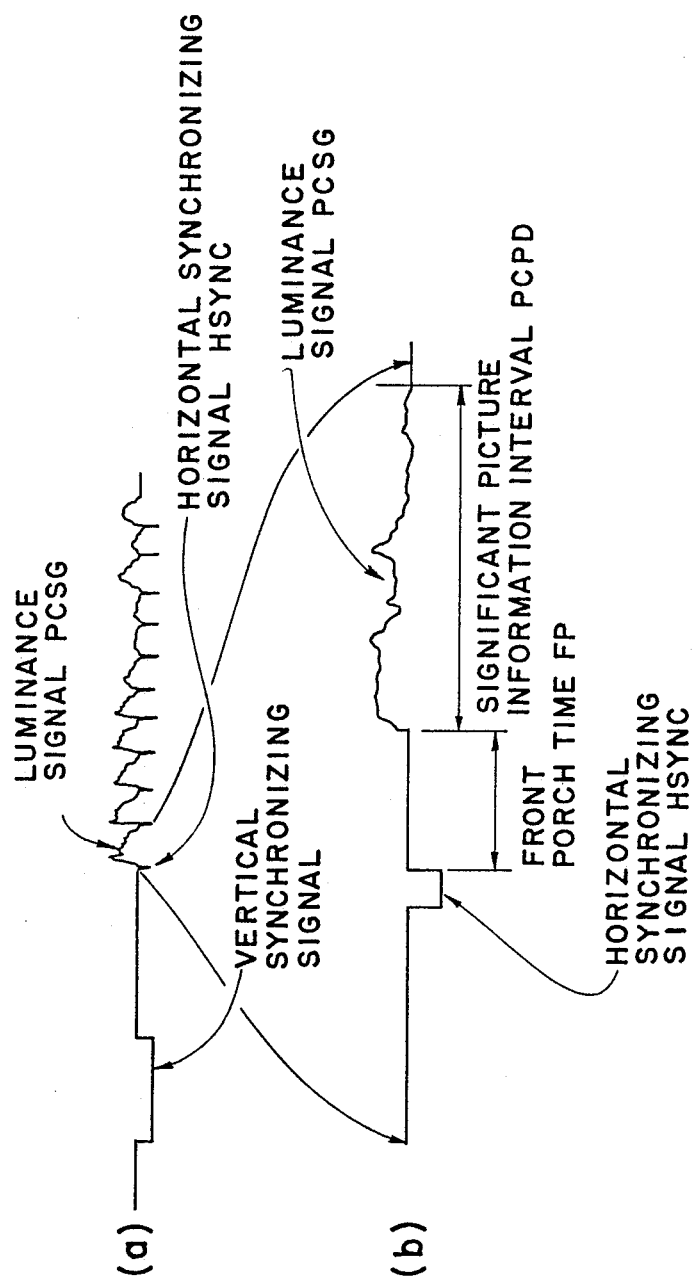

PICTURE INTRODUCING APPARATUS

BACKGROUND OF THE INVENTION

1. Field of the Invention

This invention relates to a picture processing apparatus for processing picture information introduced from a picture input unit such as an industrial camera by a raster scanning system.

2. Description of the Related Art

When one frame of a picture of a CRT display is introduced into a picture processing apparatus from a picture input unit (hereinafter referred to simply as a "camera") such as an industrial camera by a raster scanning system, the picture signal outputted by the camera comprises one vertical synchronizing signal VSYNC for establishing synchronization of a picture in the vertical direction, a plurality of horizontal synchronizing signals HSYNC for establishing synchronization of the picture in the horizontal direction, and a luminance signal PCSG which includes significant picture information. FIGS. 3(a) and (b) illustrate an example of a general picture signal waveform. FIG. 3(a) is a time chart of a signal waveform corresponding to one frame, and FIG. 3(b) is a time chart regarding one line in the horizontal direction.

The luminance signal PCSG is effective in a significant picture information interval PCPD, and the significant picture information interval PCPD is provided in sychronization with each horizontal signal HSYNC. In other words, the signficant picture information interval PCPD starts a predetermined period of time (the front porch time FP) after the horizontal synchronizing signal HSYNC is produced.

The front porch time FP from the horizontal synchronizing signal HSYNC to the start of the significant picture information interval PCPD generally differs from one type of camera to another. Since the conventional apparatus for introducing the picture is designed solely for a specific type of camera, the front porch time FP is set so as to conform to the picture signal from the camera. Accordingly, if a picture from the camera of a different type is to be introduced using the conventional picture introducing apparatus, the front porch time FP will not conform. As a result, the picture signal will not be introduced in a faithful and accurate manner.

SUMMARY OF THE INVENTION

The present invention has been devised in order to solve the foregoing problem and its object is to provide a picture processing apparatus in which significant picture information can be introduced in an accurate manner by bringing the front porch time into conformance with cameras of a variety of different types.

In accordance with the present invention, a picture processing apparatus which solves the problems of the prior art is provided, which comprises a picture memory section for storing a picture signal, storage means for storing a front porch time extending from generation of a horizontal synchronizing signal of a picture signal until start of a significant picture information interval, calculating means for calculating the starting time of the significant picture information interval by referring to the stored front porch time, and introducing means for introducing significant picture information into the picture memory section from the timing of the starting time of the significant picture information interval calculated by the calculating means.

In accordance with the picture processing apparatus of the present invention, front porch time extending from generation of the horizontal synchronizing signal until start of the significant picture information interval is stored, and the significant picture information is introduced by calculating the starting time of the significant picture information interval by referring to the stored front porch time. Therefore, even if the front porch time differs depending upon the type of picture input unit, different picture input units can be dealt with by storing the front porch time corresponding to the picture input unit. This makes it possible to introduce the significant picture information in an accurate manner.

The calculation of the starting time of the significant picture information interval performed by the calculating means and the accompanying processing for introducing the significant picture information performed by the introducing means are carried out for every horizontal synchronizing signal. In addition, if a picture input unit having a different front porch time is used, the front porch time presently stored in the register is changed to another value by a host computer.

DESCRIPTION OF THE PREFERRED EMBODIMENT

An embodiment of the present invention will now be described in detail with reference to the drawings.

Figure 1:
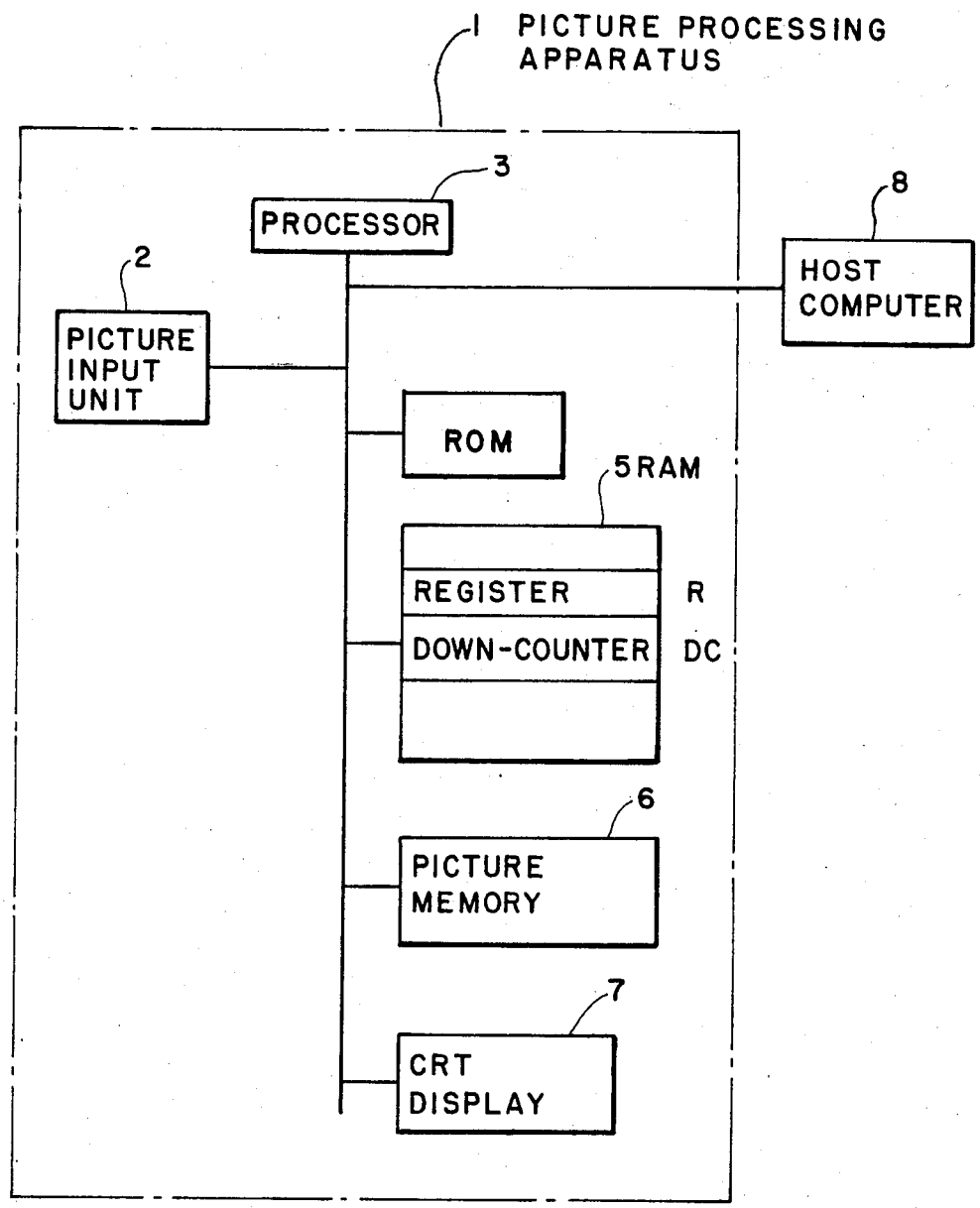
FIG. 1 is a system block diagram of a picture processing apparatus embodying the present invention.
Figure 2:
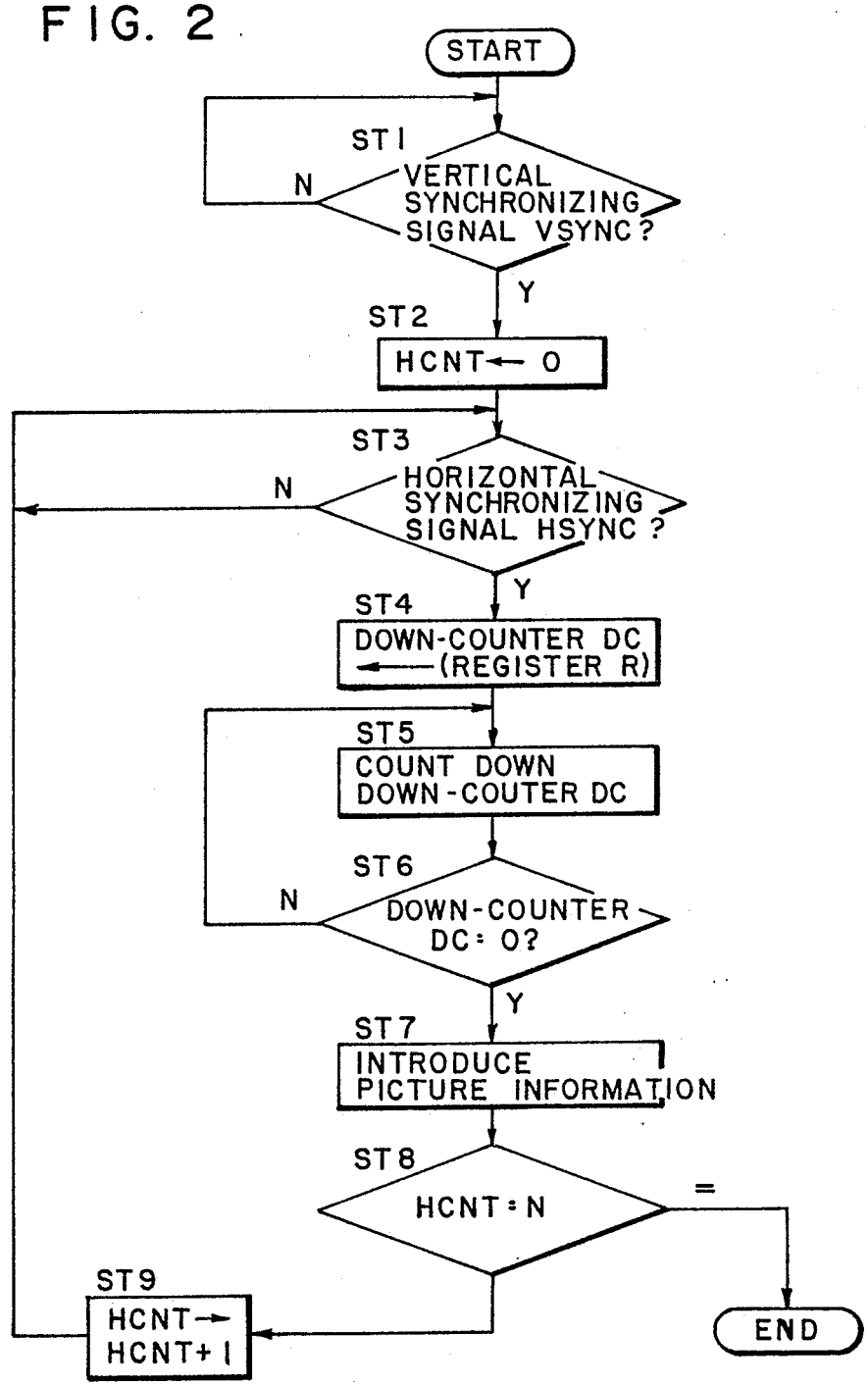
FIG. 2 is a flow chart showing the flow of a picture introducing processing in the embodiment of FIG. 1; and, FIG. 3(a) is a view illustrating a time chart of signals for displaying picture information in one frame of a CRT display, and (b) is a view illustrating a time chart of signals in a single horizontal scan.

FIG. 1 is a system block diagram of a picture processing apparatus, and FIG. 2 is a flowchart illustrating the flow of a picture introducing processing according to the present invention.

In FIG. 1, a picture processing apparatus 1 comprises a picture input unit 2 such as an industrial camera, a processor 3 for processing picture information inputted from the picture input unit 2, a read-only memory (ROM) 4 storing a program for controlling the operation of the processor 3, a RAM 5 for storing the intermediate results of processing performed by the processor 3, a picture memory section, namely a frame memory 6, for storing picture information processed by the processor 3, and a CRT display 7 for displaying picture information stored in the frame memroy 6. Processing for the introduction of a picture is executed by the processor 3 controlled by a microprogram stored in the ROM 4. When the microprogram is executed, use is made of an area for a register R and an area for a downcounter DC in the RAM 5.

A front porch time FP conforming to the picture input unit 2 presently connected to the system is stored beforehand in the register R. The front porch time FP is supplied from an external host computer 8 or the like, which can supply the front porch time for a variety of picture input units. If a different picture input unit is to be connected, it will suffice to store a different front porch time conforming to this input unit in the register R, as supplied by the host computer 8. Thus, it is possible to alter the front porch time FP in accordance with the type of picture input unit 2.

The front porch time FP stored in the register R from the host computer 8 is preset in the down-counter DC. Thus the time required for the value of the count in the down-counter DC to reach zero, namely the time from output of the horizontal synchronizing signal HSYNC until the beginning of the significant picture information interval PCPD, is measured.

The operation of the picture introducing apparatus constructed as set forth above will now be described with reference to the flowchart of FIG. 2. It should be noted that the flowchart is an example of a picture introducing process implemented by the microprogram in the ROM 4.

The front porch time FP conforming to the picture input unit 2 presently connected is stored beforehand by the host computer 8 in the register R of the RAM 5.

FIrst, it is determined (step ST1) whether the vertical synchronizing signal VSYNC from the picture inoput unit 2 has been outputted. If the vertical synchronizing signal VSYNC has not yet been outputted, the program repeats step ST1 until the output of the signal. When the vertical synchronizing signal VSYNC is outputted, this is recognized as indicating the start of a new picture frame, upon which the program proceeds to the next step, which is step ST2. This step is for starting processing to introduce a picture and involves initially setting a counted value HCNT of the horizontal synchronizing signals HSYNC to "0". Next, it is determined (step ST3) whether the horizontal synchronizing signal HSYNC from the picture input unit 2 has been outputted. If the horizontal synchronizing signal HSYNC has not yet been outputted, the program repeats step ST3 until the output of the signal. When the horizontal synchronizing signal HSYNC is outputted, the program proceeds to a step at which the front porch time FP is counted starting from the moment the horizontal synchronizing signal HSYNC is outputted.

In step ST4, the front porch time FP stored beforehand in the register R is preset in the down-counter DC. Next, in step ST5, the down-counter DC is counted down at a predetermined timing rate. In step ST6, the decremented value in the down-counter DC is checked to determine if it has reached zero. If it has not, this means that the front porch time FP has not elapsed. Accordingly, the program returns to step ST5 to continue the countdown. When the counted value in the down-counter DC becomes zero, this means that the front porch time FP has elapsed. At this time, the picture information from the picture input unit is construed to be in the significant picture information interval PCPD. As a result, the picture starts to be introduced to the frame memory 6 (step ST7). After the picture information, namely the luminance signal PCSG, is introduced to the frame memory 6 from the first scan in the horizontal direction, it is determined whether all of the horizontal synchronizing signals HSYNC, and thus all the picture information, has been introduced (step ST8). In other words, following the output of the vertical synchronizing signal VSYNC and the output of each subsequent horizontal scanning signal, it is determined whether all of the horizontal synchronizing signals HSYNC have been outputted. If the counted value HCNT has not yet reached a predetermined value N, this means that all of the horizontal synchronizing signals HSYNC have not yet been outputted. In such case, the counted value HCNT is incremented by +1 at a step ST9 and the program returns to step ST3 to introduce the picture information synchronized with the next horizontal synchronizing signal HSYNC.

When processing for introducing picture information is thus performed with regard to all of the plurality of horizontal synchronizing signals HSYNC and the counted value HCNT equals value N at the step ST8, the processing for introducing the picture is terminated.

Though an embodiment of the present invention has been described, the invention is not limited thereto but can be modified in various ways without departing from the scope of the claims.

The picture processing apparatus of the invention is useful in that by storing a front porch time corresponding to the type of picture input unit such as an industrial camera or the like, the apparatus can be made to conform to different picture input units so that processing can be performed upon introducing the significant picture information in accurate fashion.

We claim:

1. A picture processing apparatus for processing a picture signal introduced from a picture input unit by a raster scanning system, comprising:
   a picture memory section for storing significant picture information;
   storage means for storing a front porch time extending from generation of a horizontal synchronizing signal of the picture signal until start of a significant picture information interval;
   calculating means for calculating the starting time of the significant picture information interval by referring to the stored front porch time; and
   introducing means for introducing the significant picture information into said picture memory section beginning at the starting time of the significant picture information interval calculated by said calculating means.

2. A picture processing apparatus according to claim 1, wherein a host computer provides said storage means with the front porch time conforming to a picture input unit in use.

3. A picture processing apparatus according to claim 1, wherein said storage means is a RAM having a register area.

4. A picture processing apparatus according to claim 3, wherein said calculating means is a down-counter set in the RAM separately from the register area, and the front porch time is first stored in the register area and then preset in the down-counter, such that when the horizontal synchronizing signal is output from the picture input unit, the down-counter starts decrementing until the value equals zero, which indicates the starting time of the significant picture information interval.

5. A picture processing apparatus according to claim 1 further comprising a ROM for storing a microprogram, wherein said introducing means executes picture introducing processing by controlling the picture processor in accordance with the microprogram.

6. A picture processing apparatus, in communication with a host computer, for processing a picture signal having a vertical synchronizing signal and a plurality of horizontal synchronizing signals, each of the horizontal synchronizing signals being following by a significant picture information interval which begins at a given front porch time after the beginning of each horizontal synchronizing signal, said apparatus comprising:
   a picture input unit for inputting the picture signal;

first memory means for storing the front porch time supplied by the host computer;

a down-counter, operatively connected to said first memory means, to be loaded with a value representing the front porch time from said first memory means and initiated when said picture input unit outputs one of the horizontal synchronizing signals; and third memory means for storing data from the picture signal when the value of said down-counter has reached zero, which indicates the start of the significant picture information interval following the horizontal synchronizing signal, which is determined to be present.

7. A picture processing apparatus according to claim 6, further comprising third memory means for storing a control program which controls the picture processing apparatus.

8. A picture processing apparatus according to claim 6, wherein the host computer supplies said first memory means with the front porch time corresponding to a picture input unit to be used by the picture processing apparatus.

9. A method for storing significant picture information intervals in a picture signal from a picture input unit, said method comprising the steps of:
(a) storing a front porch time;
(b) inputting the picture signal from the picture unit;
(c) monitoring the picture signal for a horizontal synchronizing signal;
(d) counting down the stored front porch time upon detection of a horizontal synchronizing signal such that the time required for the stored front porch time to be counted down to zero equals the time between the horizontal synchronizing signal and a significant picture information interval;
(e) storing data from the picture signal when the value of the stored front porch time reaches zero; and
(f) repeating steps (c) through (e) for each horizontal synchronizing signal.

* * * * *